Jan. 3, 1950     H. F. VICKERS     2,493,512
POWER TRANSMISSION
Filed Feb. 24, 1945
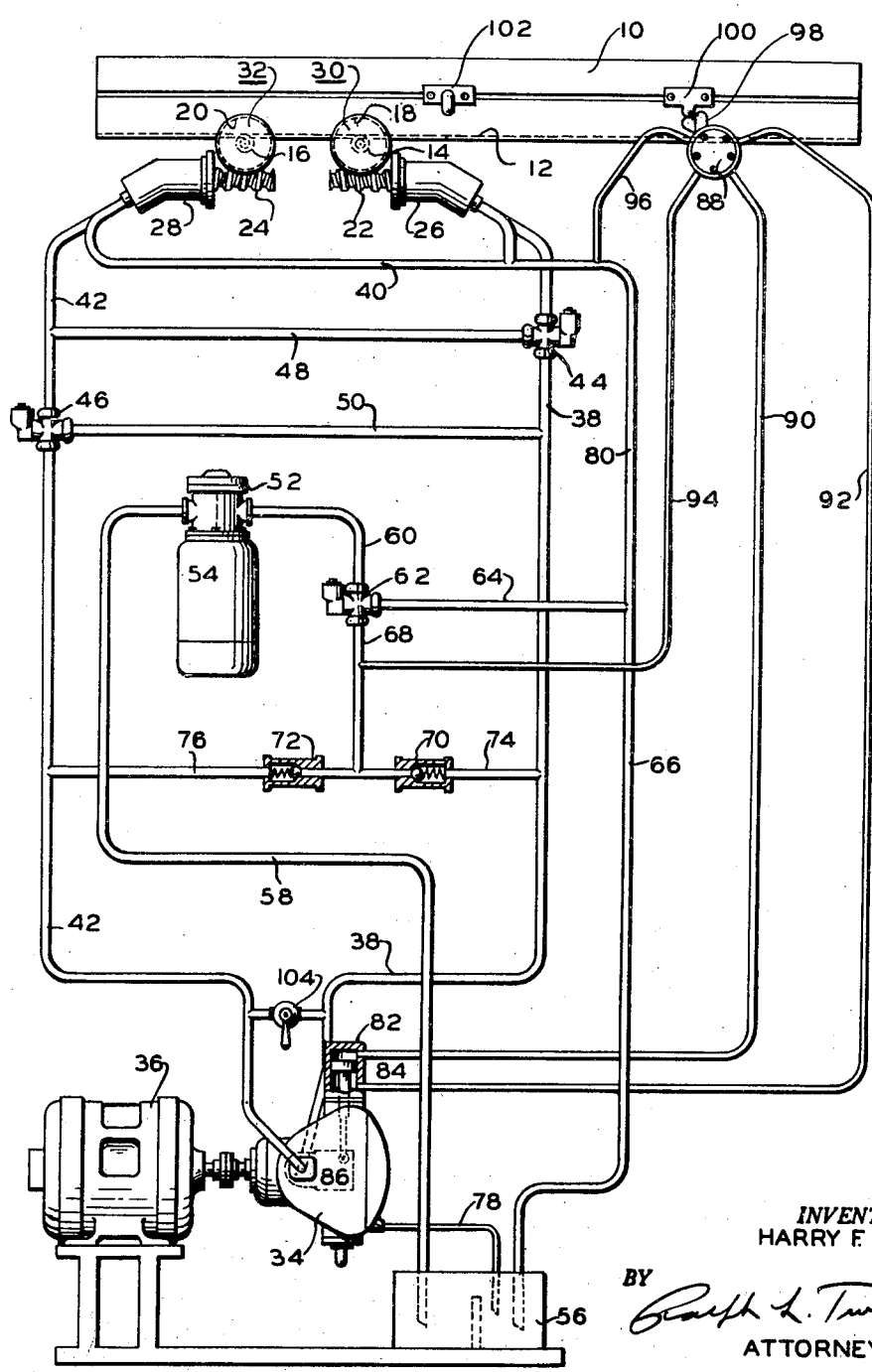
INVENTOR.
HARRY F. VICKERS
BY
*Ralph L. Tweedale*
ATTORNEY Patented Jan. 3, 1950

2,493,512

UNITED STATES PATENT OFFICE 2,493,512

POWER TRANSMISSION

Harry F. Vickers, Detroit, Mich., assignor to Vickers Incorporated, Detroit, Mich., a corporation of Michigan Application February 24, 1945, Serial No. 579,578

13 Claims. (Cl. 90—22)

This invention relates to power transmissions, particularly to those of the type comprising two or more fluid pressure energy translating devices, one of which may function as a pump and another as a fluid motor.

The invention is more particularly concerned with a power transmission system for reversibly driving a load device in a manner to eliminate the effects of backlash in any mechanical gearing which may be utilized between the output of the hydraulic transmission and the load being driven.

There are many applications of reversible hydraulic transmissions which involve mechanical gearing either to reduce or to increase the speed ratio between the fluid motor and the load device. In such applications, any backlash which is present in the gearing, either as originally manufactured or after the gears have become worn, is objectionable for many reasons. Backlash in the gearing driving a reciprocating machine tool table, for example, causes a variation in the exact point of reversal which may be critical on certain types of machining operations. In addition, it imposes shock loads on the teeth, bearings and other parts of the mechanism which accelerate wear and shorten the life of the machine. Likewise, backlash in gearing driving gun mounts, turrets, searchlights and similar ordnance equipment greatly interferes with the accuracy of its control, particularly when controlled from automatic directing mechanism.

It is an object of the present invention to provide an improved power transmission system, preferably hydraulic, in which these difficulties will be eliminated.

A further object is to provide such a system wherein gear trains manufactured to ordinary commercial tolerances and having appreciable backlash may be utilized without having any backlash detectable in the driving action between the power transmission and the load device.

It is a further object to provide an improved hydraulic power transmission system in which fluid pressure from a reversible source is utilized in one fluid motor for driving in one direction and in a different fluid motor for driving in the opposite direction.

It is also an object to provide a hydraulic power transmission system of this character in which backlash is taken up constantly in the same direction in the gearing between each fluid motor and the load.

Further objects and advantages of the present invention will be apparent from the following description, reference being had to the accompanying drawing wherein a preferred form of the present invention is clearly shown.

In the drawing the single figure represents a diagrammatic view of a power transmission system incorporating a preferred form of the present invention.

Referring now to the drawing, a reciprocating machine tool table 10 is illustrated as representative of a typical load device adapted to be driven alternately in opposite directions. The table 10 may be provided with rack teeth 12 on its lower surface meshing with pinions 14 and 16 which in turn are driven by worm wheels 18 and 20 meshing with worms 22 and 24 carried by the output shaft of fluid motors 26 and 28. It will be seen that there are duplicate gear trains 30 and 32, one for each of the motors 26 and 28, respectively. It is contemplated that the helix angle of the worms 22 and 24 is great enough so that they will not be self-locking. It will be understood, of course, that any other suitable type of non-locking mechanical gearing may be interposed between the fluid motors and the load device.

The fluid motors are connected in a series circuit with a reversible source of pressure fluid which is illustrated as a reversible variable-displacement pump 34 driven by a suitable electric motor 36. The series circuit is constituted by a conduit 38 leading from one side of the pump to one side of the motor 26, a conduit 40 leading from the other side of motor 26 to one side of motor 28, and a conduit 42 leading from the other side of motor 28 back to the other side of pump 34. Suitable overload protection is provided by relief valves 44 and 46 of conventional construction and connected to relieve fluid from the lines 38 and 42, respectively, over to the opposite lines through bypass conduits 48 and 50, respectively.

A replenishing pump 52 may be driven by a suitable electric motor 54 and has its intake connected to a tank 56 by a conduit 58. The discharge of pump 52 leads through a conduit 60 to a relief valve 62 which relieves through a conduit 64 and a conduit 66 back to the tank 56 whenever a predetermined low intermediate pressure is exceeded in the conduit 60. From the relief valve 62, a conduit 68 extends to the inlet ports of a pair of check valves 70 and 72 which have their outlets connected by conduits 74 and 76 to the main line conduits 38 and 42, respectively. The casing of pump 34 is also connected to the tank 56 by a drain conduit 78 so that leakage from the main circuit at pump 34 may be collected in the casing thereof and returned to the circuit through conduit 78, tank 56 and the replenishing circuit just described. Leakage out of the main circuit at motors 26 and 28 is collected in their casings which are each internally connected to the conduit 40, and the latter is connected to the tank 56 by means of conduit 66 and a branch conduit 80.

Any suitable means for reversing the flow of fluid from the source may be provided; for example, the pump 34 may be provided with the usual stroke-changing mechanism, represented by the hydraulic cylinder 82 and piston 84, which is connected to the shiftable yoke 86 of the pump to vary and reverse its delivery in the well-known manner. The cylinder 82 has its opposite ends connected to a rotary four-way pilot valve 88 by conduits 90 and 92. Valve 88 receives pressure fluid from the pump 52 by means of a branch connection 94 leading from the pipe 68 and is connected to tank conduit 80 by a branch 96. The valve 88 may be shifted by a dual-eared trip lever 98 which is contacted by adjustable dogs 100 and 102 at the opposite ends of the table stroke.

For the purpose of stopping and starting the fluid motors 26 and 28, any suitable manually-operated bypass valve 104 may be provided and connected across the main circuit conduits 38 and 42 as illustrated.

In operation, with the electric motor 36 running and the system filled with oil, when bypass valve 104 is open, the fluid delivered by pump 34 will be circulated idly through the valve 104. Should the yoke 86 of the pump 34 be in any position intermediate its two extreme limits of travel, as, for example, in the neutral position illustrated, fluid delivered by pump 52 will traverse the pilot circuit and force the yoke to one or the other of its extreme positions. For example, in the position of the parts shown on the drawing, fluid from pump 52 will pass through conduits 60, 68 and 94, valve 88 and conduit 92 to force the piston 84 upwardly, thus placing the pump on stroke in a position to withdraw fluid from conduit 42 and deliver it into conduit 38 to fluid motor 26. This causes rotation of fluid motor 26 and worm 22, top toward observer, driving worm wheel 18 clockwise and table 10 to the right. Fluid discharged from motor 26 passes through conduit 40 to the motor 28 from which it is discharged into conduit 42 back to the pump 34.

It will be seen that, due to the slight but appreciable amount of leakage at fluid motor 26, a small amount of fluid will be constantly drawn into conduit 40 from tank 56 through conduits 80 and 66. Likewise, a small amount of oil will be delivered from pump 52 through conduits 60 and 68, check valve 72 and conduit 76 to the conduit 42 to make up for leakage lost at motor 28 and pump 34. Since both fluid motors 26 and 28 rotate in unison with the movements of table 10, motor 28 will be driven as a pump with its intake at atmospheric pressure or slightly below and with its outlet at the low intermediate pressure maintained by relief valve 62. The backlash in the gearing 30 will be taken up in the direction to transmit driving force from the motor 26 to the table 10 in the righthand direction, while the backlash at gearing 32 will be taken up oppositely, that is, for righthand drive from table 10 to the motor 28.

When the table 10 reaches the limit of its stroke to the right, dog 102 will contact trip lever 98, shifting pilot valve 88 and directing pilot fluid to conduit 90 to force piston 84 downwardly and thus reverse the pump 34. Fluid is now taken into the pump from conduit 38 and delivered to conduit 42, driving the motor 28 as a pump which, through gearing 32, will drive table 10 to the left. The direction of backlash take-up in the gearing 32 for driving table 10 to the left by motor 28 is the same as the backlash take-up under conditions previously described. Likewise, the backlash take-up in gearing 30, when table 10 moves to the left and drives motor 26 as a pump, is the same as before. Thus, at the very instant of reversal of flow between lines 38 and 42, all backlash is taken up for lefthand drive of the table by motor 28, and the table responds instantly without waiting for any backlash to be taken up.

Since the main drive circuit and replenishing circuit are symmetrical, it will be evident that all of the conditions described for righthand drive of the table are correspondingly present during lefthand drive and that, after reaching the end of its movement to the left, table 10 will cause dog 100 to strike the trip lever 98 and reverse the table movement and fluid flow in a manner exactly analogous to that previously described. It will thus be seen that there has been provided a novel power transmission system in which the effects of backlash in the drive gearing are totally eliminated.

It will be seen that during operation in a given direction, for example, table travel to the right, energy in the form of a flow of fluid under pressure is transferred from the source or pump 34 to the motor 26 at a high level of potential energy, that is, at a high pressure. Fluid leaves the motor 26 and is transferred to the motor 28 at a very low level of energy potential. The motor 28, however, acts to transfer energy to the source 34 at a low intermediate level of potential energy. In other words, the power required for the table 10 to drive motor 28 as a pump is returned to the circuit except for the unavoidable losses.

While the form of embodiment of the invention as herein disclosed constitutes a preferred form, it is to be understood that other forms might be adopted, all coming within the scope of the claims which follow.

What is claimed is as follows:

1. In a hydraulic power transmission system for driving a load device in either direction, the combination of a reversible, variable displacement pump and two fluid motors connected in a series circuit, individual gearing connecting each motor to the load device, a replenishing pump, valve means for selectively connecting the delivery of the replenishing pump to whichever side of the first pump is the intake at any time, and means establishing a pressure lower than replenishing pump delivery pressure in the series circuit at a point between the two motors.

2. In a hydraulic power transmission system for driving a load device in either direction, the combination of a reversible, variable displacement pump and two fluid motors connected in a series circuit, individual gearing connecting each motor to the load device, a replenishing pump, valve means for selectively connecting the delivery of the replenishing pump to whichever side of the first pump is the intake at any time and thereby maintaining a positive replenishing pressure on the intake of the first pump, and means for maintaining in the series circuit between the two motors a pressure below the replenishing pressure.

3. In a hydraulic power transmission system for driving a load device in either direction, the combination of a reversible source of fluid pressure, a pair of fluid motors, one connected to each side of said source and each connected to the other motor, gearing mechanically connecting each motor to the load device, means maintaining a predetermined low pressure in the connection between the motors, and means for maintaining a predetermined higher pressure in the fluid returning to said source.

4. In a hydraulic power transmission system for driving a load device in either direction, the combination of a reversible source of fluid pressure, a pair of fluid motors, one connected to each side of said source and each connected to the other motor, gearing mechanically connecting each motor to the load device, means maintaining atmospheric pressure in the connection between the motors, and means for maintaining a predetermined higher pressure in the fluid returning to said source whereby in either direction of operation the motor first receiving fluid from the source drives the load and the load drives the other motor as a pump against said predetermined higher pressure to thereby take up the backlash in the gearing of the other motor in readiness for operation in the opposite direction at the instant that flow from the source is reversed.

5. In a hydraulic power transmission system for driving a load device in either direction, the combination of a first fluid motor geared to the load device to drive the load device in one direction and be driven by the load device as a pump in the opposite direction, a second fluid motor geared to the load device to drive the load device in the opposite direction and be driven by the load device as a pump in the one direction, a source of fluid pressure and means for directing fluid therefrom to either the first motor or the second motor, and means for maintaining a back pressure against either motor whenever it is being driven as a pump whereby gearing backlash is always taken up in the same direction at either motor.

6. In a hydraulic power transmission system for driving a load device in either direction, the combination of a first fluid motor geared to the load device to drive the load device in one direction and be driven by the load device as a pump in the opposite direction, a second fluid motor geared to the load device to drive the load device in the opposite direction and be driven by the load device as a pump in the one direction, a source of fluid pressure and means for directing fluid therefrom to either the first motor or the second motor, and means including a pair of check valves, one for each motor, for maintaining a back pressure against either motor whenever it is being driven as a pump whereby gearing backlash is always taken up in the same direction at either motor.

7. In a hydraulic power transmission system for driving a load device in either direction, the combination of a first fluid motor geared to the load device to drive the load device in one direction and be driven by the load device as a pump in the opposite direction, a second fluid motor geared to the load device to drive the load device in the opposite direction and be driven by the load device as a pump in the one direction, a reversible, variable displacement pump for directing fluid therefrom to either the first motor or the second motor, and means for maintaining a back pressure against either motor whenever it is being driven as a pump whereby gearing backlash is always taken up in the same direction at either motor.

8. In a hydraulic power transmission system for driving a load device in either direction, the combination of a first fluid motor geared to the load device to drive the load device in one direction and be driven by the load device as a pump in the opposite direction, a second fluid motor geared to the load device to drive the load device in the opposite direction and be driven by the load device as a pump in the one direction, a reversible, variable displacement pump for directing fluid therefrom to either the first motor or the second motor, and means including a replenishing pump and pressure-responsive valve means for maintaining a back pressure against either motor whenever it is being driven as a pump whereby gearing backlash is always taken up in the same direction at either motor.

9. In a hydraulic power transmission system for driving a load device in either direction, the combination of a first fluid motor geared to the load device to drive the load device in one direction and be driven by the load device as a pump in the opposite direction, a second fluid motor geared to the load device to drive the load device in the opposite direction and be driven by the load device as a pump in the one direction, a reversible, variable displacement pump for directing fluid therefrom to either the first motor or the second motor, and means including a replenishing pump and pressure-responsive valve means for maintaining a back pressure against either motor whenever it is being driven as a pump whereby gearing backlash is always taken up in the same direction at either motor, said motors each having their motor discharge ports connected to a supply of fluid at atmospheric pressure.

10. In a hydraulic power transmission system for driving a load device in either direction, the combination of a first fluid motor geared to the load device to drive the load device in one direction and be driven by the load device as a pump in the opposite direction, a second fluid motor geared to the load device to drive the load device in the opposite direction and be driven by the load device as a pump in the one direction, a reversible, variable displacement pump for directing fluid therefrom to either the first motor or the second motor, and means including a replenishing pump and pressure-responsive valve means for maintaining a back pressure against either motor whenever it is being driven as a pump whereby gearing backlash is always taken up in the same direction at either motor, said motors each having their motor discharge ports connected together.

11. In a power transmission system for driving a load device in either direction, the combination of two energy translating devices, each being reversible as to direction of rotation, gearing mechanically connecting each translating device to the load, a source of driving energy including means for applying the driving energy to either translating device alternately in opposite directions of rotation, and a circuit coupling the source and the translating devices all in series for the transfer of energy from the source to one translating device and thence to the load device at a high rate, and from the load device to the other translating device and thence to the source at a lower rate.

12. In a hydraulic power transmission system connected to a source of pressure fluid for driving a load device in either direction, the combination of two fluid motors mechanically coupled to a load device and adapted to exert opposing driving forces to the load device, means for maintaining higher fluid pressure on one motor than on the other and driving the load device in one direction, and means for simultaneously shifting the higher fluid pressure to the other motor and reversing the direction.

13. In a hydraulic power transmission system connected to a source of pressure fluid for driving a load device in either direction, the combination of two fluid motor-pump power units each mechanically coupled to the load device and adapted to drive or be driven by the load device, means for selectively directing pressure fluid to either power unit for driving the load device in opposite directions, respectively, and operating the other power unit as a pump, and means for maintaining a minimum operating pressure on the discharge side of the power unit opposing its operation as a pump and thereby eliminating backlash in its coupling to the load device.

HARRY F. VICKERS.

REFERENCES CITED

The following references are of record in the file of this patent:

UNITED STATES PATENTS

| Number | Name | Date |
|---|---|---|
| 2,309,637 | Fickett et al. | Feb. 2, 1923 |
| 2,236,256 | Allard | Mar. 25, 1941 |
| 2,267,696 | Groene et al. | Dec. 23, 1941 |